No. 875,426. PATENTED DEC. 31, 1907.
A. H. GITS.
DRIVE BELT.
APPLICATION FILED SEPT. 19, 1907.
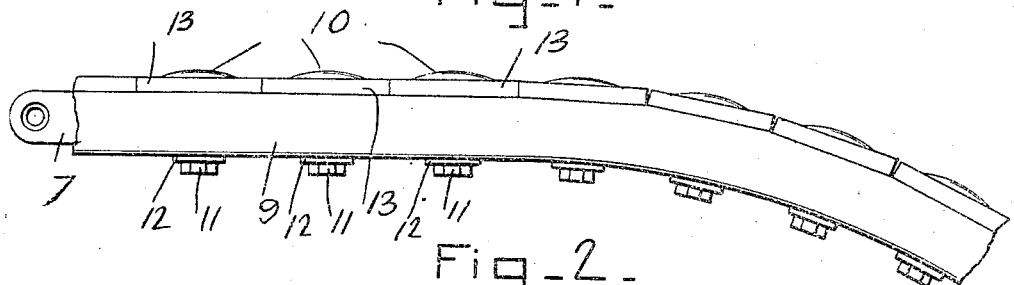
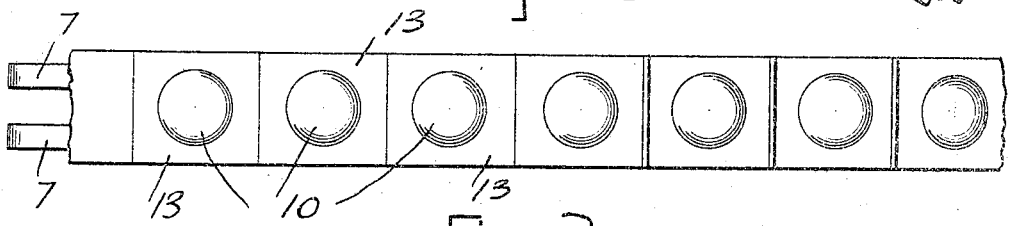
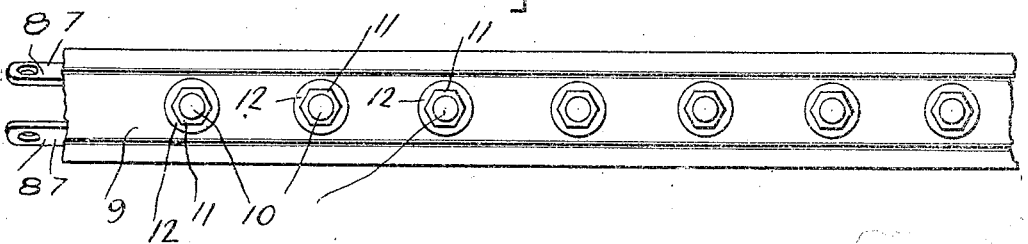
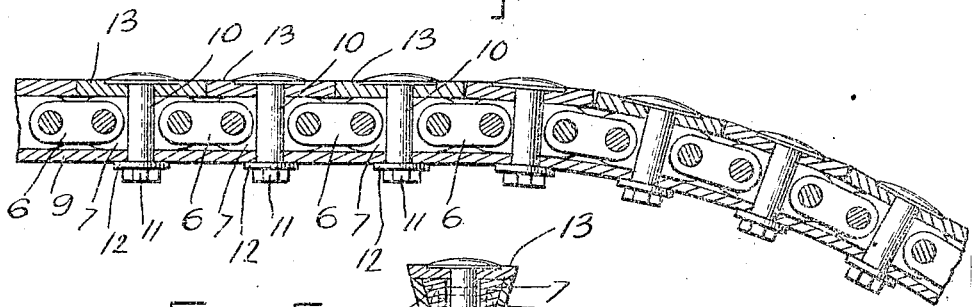
Witnesses
Inventor
Alphons H. Gits

UNITED STATES PATENT OFFICE.

ALPHONS H. GITS, OF CHICAGO, ILLINOIS.

DRIVE-BELT.

No. 875,426.  Specification of Letters Patent.  Patented Dec. 31, 1907.

Application filed September 19, 1907. Serial No. 393,667.

To all whom it may concern:

Be it known that I, ALPHONS H. GITS, a citizen of the United States, residing at Chicago, in the county of Cook, State of Illinois, have invented certain new and useful Improvements in Drive-Belts; and I do hereby declare the following to be a full, clear, and exact description of the invention, such as will enable others skilled in the art to which it appertains to make and use the same.

This invention relates to belts and more particularly to that class which are made up of metallic chain and leather or other frictional material.

In providing a belt constructed as will be presently fully described, I have in view the production of a belt which will not stretch, will be strong and durable, flexible, and in which the friction element or material will have a firm backing. This last mentioned advantage I secure by using a chain which is beveled in cross section and the side portions of the friction material rest against the beveled sides of the chain and are firmly braced thereby providing for a greater friction surface.

In the accompanying drawings, Figure 1 is a side elevation of a length of the belt. Fig. 2 is a top plan view thereof, Fig. 3 is a bottom plan view, Fig. 4 is a vertical longitudinal sectional view through the length, and, Fig. 5 is a similar view taken transversely of the belt in a line with one of the bolts for securing the friction material to the chain.

In the accompanying drawings, the belt is shown as being composed, in part, of a chain which is of substantially the same construction as an ordinary bicycle sprocket chain and which is made up of blocks 6 and links 7, the latter having their outer faces beveled as indicated by the numeral 8.

The friction element of the chain is in the form of a strip 9 of rawhide or other suitable material having frictional properties and this strip is secured to the under side of the chain by means of bolts 10 which have rather large, but flat, heads and have engaged upon them nuts 11 and washers 12, the said washers being interposed between the nuts and the friction strip. These bolts are passed between the links of the chain and through rectangular pieces of hard leather 13 which are disposed and held by the bolts, against the upper surface of the chain. The raw hide is so shaped transversely that it not only rests against the under side of the chain but also against the beveled sides of the links thereof and the said sides of the links serve, as will be readily understood, as a solid backing for the strip. The upper edges of the strip of raw hide terminate directly beneath the pieces of hard leather which are secured to the upper surface of the chain and consequently the chain is practically inclosed throughout its entire length and is therefore protected from the elements. Not only do the pieces of hard leather protect the upper surface of the chain, but they also prevent wedging of the chain in the groove of the pulley around which it is passed.

From the foregoing description of my invention, it will be seen that I have provided a belt of this class which is inelastic, durable, strong, and above all very flexible, and furthermore that by beveling the sides of the links of the chain, a maximum friction surface is provided for.

What is claimed is:—

1. A drive belt of the class described comprising a metallic chain body consisting of blocks and links, a friction strip disposed against the under and side faces of the chain, rectangular pieces of hard leather disposed against the upper surface of the chain, and bolts passed through each of the last mentioned pieces and the strip and between each pair of links of the chain.

2. A drive belt of the class described comprising a metallic chain body consisting of blocks and links, the said links having their outer faces beveled, a friction strip disposed against the under and side faces of the chain, rectangular pieces of hard leather disposed against the upper surface of the chain, and bolts passed through each of the last mentioned pieces and the strip and between each pair of links of the chain.

In testimony whereof, I affix my signature, in presence of two witnesses.

ALPHONS H. GITS.

Witnesses:
 THEODORE VAN DE WYER,
 JOHN J. MULQUEEN.